United States Patent

[11] 3,586,460

| [72] | Inventor | Charles V. Toner |
| | | Wallingford, Pa. |
| [21] | Appl. No. | 824,534 |
| [22] | Filed | May 14, 1969 |
| [45] | Patented | June 22, 1971 |
| [73] | Assignee | The United States of America as represented by the Secretary of the Air Force |

[54] ROTOR BLADE VARIABLE MODULUS TRAILING EDGE
3 Claims, 3 Drawing Figs.

[52] U.S. Cl. ............................................. 416/144,
    416/230, 416/500
[51] Int. Cl. ................................................. B64c 11/18
[50] Field of Search ........................................ 416/144,
    145, 500, 241, 229, 230

[56] References Cited
UNITED STATES PATENTS

| 2,951,542 | 9/1960 | Stulen et al. | 416/144 |
| 3,323,597 | 6/1967 | Longobardi et al. | 416/144 |
| 3,105,557 | 10/1963 | Wigal | 416/226 |

*Primary Examiner*—Everette A. Powell, Jr.
*Attorneys*—Harry A. Herbert, Jr. and Arsen Tashjian ABSTRACT: A helicopter rotor blade is provided with a trailing edge of hollow construction to form a cavity in which materials of various weights and densities is contained. The structural and aerodynamic properties of the rotor blade are enhanced by controlling the mixture of the modulus fibrous materials contained in the trailing edge cavity.

PATENTED JUN22 1971 3,586,460

INVENTOR.
BY CHARLES V. TONER
Harry A. Herbert Jr
Arsen Tashjian
ATTORNEYS

ROTOR BLADE VARIABLE MODULUS TRAILING EDGE

BACKGROUND OF THE INVENTION

This invention relates to a rotor blade trailing edge structural member and, more particularly, the invention is concerned with providing proper chordwise dynamic natural frequencies by including a hollow portion in the trailing edge of a rotor blade and inserting various mixtures of fibrous materials to obtain optimum structural and aerodynamic properties.

In rotary wing lifting devices such as helicopters, it is well known that sustention in the air is accomplished by forces of upward thrust produced by the blades of a revolving rotor which are commonly driven by suitable engines directly coupled to the rotor hub. In constructing the blades of such rotors, it is accepted practice to provide a substantially rigid inboard portion for connecting each blade to a suitable hub and a thrust-producing portion for imparting downward velocity to large masses of air.

The thickness and the width or chordwise dimension of the thrust-producing portion is contoured throughout the length or span according to proven airfoil designs to provide each blade with optimum thrust-producing efficiency. Also, each blade is constructed so as to fulfill several operational requirements. Among the most important of these requirements is that it must be capable of adjustment for mass balance and control forces. This requirement is primarily due to the nature of the operation of the rotor blade which produces periodic reversing stresses to form one of the essential load systems to which the rotor blade is subject and one which to a great extent determines the design. Weight is one of the decisive factors, not only on account of the weight of the blade itself but also because of its influence on associated components, loaded by centrifugal force, mainly in the hub mechanism and its control.

In a manually controlled rotor, the control forces determine the chordwise mass distribution of the blade. The rate of application term in the cyclic pitch control force can be balanced out when the center of gravity (c.g.) is set at the aerodynamic center. The c.g. position for zero collective pitch control depends on the aerodynamic moment of the profile and centrifugal pitching couple.

The centrifugal pitching moment varies with pitch. The resultant pitching moment may increase or decrease with pitch according to the position of the chordwise blade c.g. There is a c.g. position for which the resultant pitching moment is nearly independent of pitch and equal to the aerodynamic moment.

Although the differences in chordwise c.g. position may seem small, the forces which are dealt with are extremely sensitive to these differences. The best compromise would be a c.g. position which gives slightly unstable rate term in the control stick force and a small pitch lever force.

The compromise is more difficult to specify accurately since the desirable and permissible control force characteristics are not precisely defined. In the design of blades for manually controlled helicopters the correction of c.g. position, as heretofore stated, is a necessary requirement and can best be accomplished by flight test experience. A quick and easy way to vary the c.g. position and corresponding dynamic properties of the rotor would be extremely helpful in determining the highest potential operational capability for the particular aircraft.

SUMMARY OF THE INVENTION

The present invention provides object rotor blade structure which permits overall design flexibility such that optimization can be experimentally achieved as to dynamically tuning of the blade by the choice and placement of the materials in the cavity along the trailing edge. The invention, by allowing the use of variable airfoil and cross section designs from root to tip, produces a blade having total flexibility of design resulting in lighter more optimum blades having significantly better structural, aerodynamic and dynamic properties.

Accordingly, it is an object of the invention to provide a rotor blade wherein the trailing edge modulus is variable to provide proper chordwise dynamic natural frequencies.

Another object of the invention is to provide a rotor blade having a variable modulus trailing edge wherein a cavity is provided to permit inclusion of various modulus materials to obtain proper dynamic properties in the chord plane of the rotor blade.

Still another object of the invention is to provide an improved rotor blade having overall design flexibility to permit optimum tuning of the blade by the choice and placement of various modulus materials along a cavity in the trailing edge thereof.

A further object of the invention is to provide a rotor blade with a variable modulus trailing edge resulting in a lighter more optimum blade having significantly better structural, aerodynamic and dynamic properties.

A still further object of the invention is to provide a rotor blade having a flexibility of design wherein the trailing edge can be fabricated to include boron, glass, or mixed modulus fibrous material. This flexibility of design results in a significantly improved potential operational capability for helicopters.

These and other objects features and advantages will become more apparent after considering the description that follows taken in conjunction with the attached drawings wherein like numbers are used throughout to refer to like elements.

IN THE DRAWING

DESCRIPTION OF A PREFERRED EMBODIMENT

Figure 1:
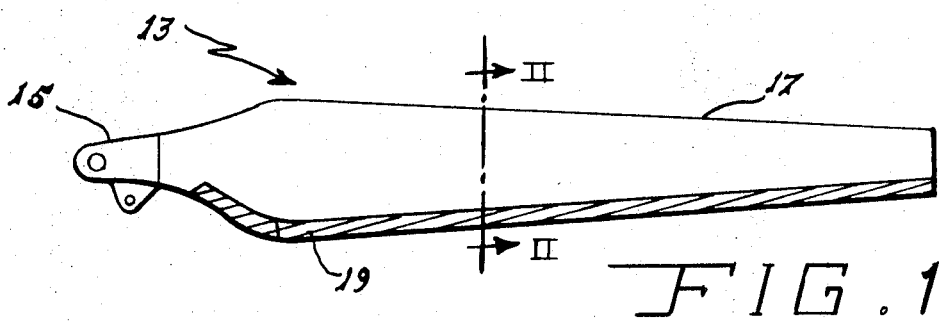
FIG. 1 is a plan view of a rotor blade according to the invention showing the trailing edge member attached thereto.
Figure 2:
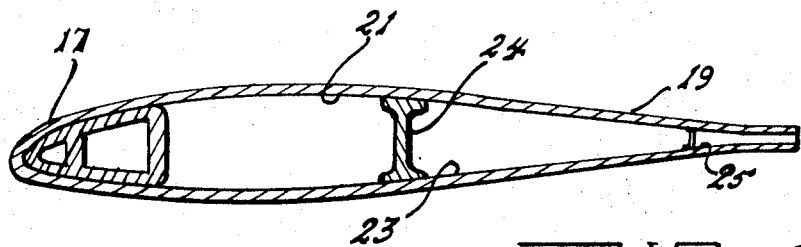
FIG. 2 is a cross-sectional view of the rotor blade of FIG. 1 taken along the line II–II.

Referring now to the drawings, there is shown a rotor blade generally identified by the reference numeral 13 having a hub attachment section 15 which is connected to a rotor hub (not shown) for rotation therearound. The rotor blade 13 includes a leading edge section 17 and a trailing edge section 19, both of which extend in the spanwise direction from root to tip. In order to form airfoil-shaped contour trailing the rotor blade includes the upper and lower sides thereof are covered with skins particulate and 23 respectively. Various ribs such as the member 24 may be installed spanwise through the blade to provide the necessary strength and stiffness.

Figure 3:
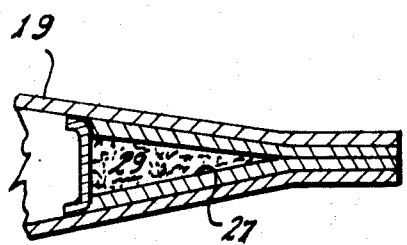
FIG. 3 is an enlarged view of the trailing edge member showing the cavity in which fibrous material can be filled.

The trailing edge section 19 of the rotor blade 13 is of hollow construction and includes a cavity 25 along the spanwise direction from root to tip. As shown in more detail in FIG. 3, the trailing edge cavity 25 includes a shell portion 27 which may be filled with particulate material 29 of various weights and densities. The insertion of a particular material or mixture of materials will have a corresponding affect on the dynamic properties of the rotor blade 13.

It will be appreciate that the design of the rotor blade 13 with the cavity 25 in the trailing edge section 19 permits overall design flexibility by allowing choice of any desired mixture of modulus fibrous materials 29. Also, the choice and placement of stuffing material 29 permits the use of variable airfoil and cross section designs from root to tip. Lighter more optimum blades with significantly better structural, aerodynamic and dynamic properties result. Thus, a significantly improved potential operational capability is imparted to helicopters utilizing the disclosed design.

The choice and placement of the material 29 is variable to a high degree. It will be understood that this relationship is dependent primarily or airfoil shape and, therefore, is not specifically dealt with herein.

Although the invention has been illustrated in the accompanying drawings and described in the foregoing specification in terms of a preferred embodiment thereof, the invention is not limited to this embodiment or the particular configuration mentioned. It will be apparent to those skilled in the art that my invention can be utilized by providing trailing edge cavities for containing materials other than mixed fibrous materials, for example, granular materials. Also, it should be understood that various changes, alterations, modifications and substitutions, particularly with respect to the construction details, can be made in the arrangement of the several elements without departing from the true spirit and scope of the appended claims.

Having thus described my invention, what I claim as new and desire to secure by Letters Patent of the United States is:

1. In a rotary wing aircraft having a rotor blade with a variable modulus trailing edge to provide chordwise dynamic natural frequencies, a triangular-shaped container means having a rearwardly oriented apex portion and extending inside and longitudinally along the trailing edge of the rotor blade, a particulate material selectively positioned in said container means, said container means including upper, lower and forward wall sections, and fibrous material of a specific weight and density being selectively intermixed with said particulate material in said container means in varying amounts and concentrations so as to correspondingly vary the structural and aerodynamic properties of the rotary wing aircraft, thereby allowing overall design flexibility of the rotor blade to achieve optimum operational capability of the rotary wing aircraft.

2. In a rotor blade as defined in claim 1 wherein the material contained in said container means includes mixed modulus fibrous materials.

3. In a rotor blade as defined in claim 1 wherein the material contained in said container means includes fibrous glass.